(12) United States Patent
Arazoe et al.

(10) Patent No.: US 12,712,472 B2
(45) Date of Patent: Aug. 18, 2026

(54) TRIBOELECTRIC FILM LAMINATE BASED ON CONDUCTIVE PRIMER

(71) Applicant: 3M INNOVATIVE PROPERTIES COMPANY, St. Paul, MN (US)

(72) Inventors: Hiroki Arazoe, Tokyo (JP); Tasuku Nakayama, Ninomiya town (JP); Yuji Hiroshige, Tokyo (JP); Shinsuke Kondo, Higashine-City (JP); Masaaki Furusawa, Sagae City (JP)

(73) Assignee: 3M Innovative Properties Company, St. Paul, MN (US)

( * ) Notice: Subject to any disclaimer, the term of this patent is extended or adjusted under 35 U.S.C. 154(b) by 290 days.

(21) Appl. No.: 18/294,298

(22) PCT Filed: Aug. 2, 2022

(86) PCT No.: PCT/IB2022/057160

§ 371 (c)(1),
(2) Date: Feb. 1, 2024

(87) PCT Pub. No.: WO2023/012660

PCT Pub. Date: Feb. 9, 2023

(65) Prior Publication Data

US 2024/0356461 A1 Oct. 24, 2024

Related U.S. Application Data

(60) Provisional application No. 63/229,603, filed on Aug. 5, 2021.

(51) Int. Cl.
*H02N 1/04* (2006.01)
*G01L 1/00* (2006.01)

(52) U.S. Cl.
CPC .............. *H02N 1/04* (2013.01); *G01L 1/005* (2013.01); *G06F 3/04164* (2019.05); *H02N 2/181* (2013.01)

(58) Field of Classification Search
None
See application file for complete search history.

(56) References Cited

U.S. PATENT DOCUMENTS 3,793,055 A 2/1974 Shodai et al.
3,895,136 A 7/1975 Makishima et al.
(Continued)

FOREIGN PATENT DOCUMENTS

BE 768992 A 11/1971
CN 102505819 B 9/2013
(Continued)

OTHER PUBLICATIONS

International Search Report for PCT Application No. PCT/IB2022/057160, mailed on Oct. 11, 2022, 4 pages.

*Primary Examiner* — Bernard Rojas

(57) ABSTRACT

A triboelectric film and its laminate that utilize a conductive primer are provided. The triboelectric effect is a type of contact electrification such that with a suitable configuration, a current may flow from one region to another. When decorative triboelectric films are touched, electrical charges are built up and the generated electrical charges between a human body and films flow through a conductive primer. This system based on the triboelectric effect and the conductive primer can provide electrical functions to decorative film products without there being any large changes.

8 Claims, 6 Drawing Sheets

(51) Int. Cl.
*G06F 3/041* (2006.01)
*H02N 2/18* (2006.01)

(56) References Cited

U.S. PATENT DOCUMENTS

| | | | | |
|---|---|---|---|---|
| 4,018,616 | A | 4/1977 | Sugahara et al. | |
| 4,347,285 | A | 8/1982 | Batdorf | |
| 5,506,045 | A | 4/1996 | Grochal | |
| 6,617,008 | B1 | 9/2003 | Kono et al. | |
| 6,641,649 | B2 | 11/2003 | John et al. | |
| 9,921,678 | B2 | 3/2018 | Wang et al. | |
| 11,759,847 | B2 | 9/2023 | Deters et al. | |
| 2012/0107605 | A1* | 5/2012 | Ozawa | C08J 7/044 428/323 |
| 2012/0256865 | A1 | 10/2012 | Hashimoto et al. | |
| 2016/0282978 | A1* | 9/2016 | Wang | B32B 27/38 |
| 2018/0299997 | A1 | 10/2018 | Isaacson et al. | |
| 2018/0348900 | A1 | 12/2018 | Heinrich et al. | |
| 2021/0048922 | A1 | 2/2021 | Murata et al. | |
| 2022/0113827 | A1 | 4/2022 | Suzuki et al. | |

FOREIGN PATENT DOCUMENTS

| | | | |
|---|---|---|---|
| CN | 103497566 | B | 4/2015 |
| CN | 104672722 | A | 6/2015 |
| CN | 104693852 | A | 6/2015 |
| CN | 105255370 | A | 1/2016 |
| CN | 104074323 | B | 3/2016 |
| CN | 104099028 | B | 5/2016 |
| CN | 105837155 | A | 8/2016 |
| CN | 107083087 | A | 8/2017 |
| CN | 105925024 | B | 12/2017 |
| CN | 107488367 | A | 12/2017 |
| CN | 105348875 | B | 2/2018 |
| CN | 108129887 | A | 6/2018 |
| CN | 108383467 | A | 8/2018 |
| CN | 209657266 | U | 11/2019 |
| CN | 108342103 | B | 6/2020 |
| CN | 108410352 | B | 11/2020 |
| CN | 113152835 | A | 7/2021 |
| DE | 2363588 | C3 | 11/1975 |
| DE | 3410844 | C2 | 7/1988 |
| DE | 202014105592 | U1 | 2/2016 |
| DE | 102014118577 | A1 | 6/2016 |
| EP | 0132078 | A2 | 1/1985 |
| EP | 0755472 | B1 | 3/1998 |
| EP | 1370502 | B1 | 5/2007 |
| EP | 3035398 | A1 | 6/2016 |
| GB | 1400434 | A | 7/1975 |
| JP | 11-013253 | A | 1/1999 |
| JP | H11-235804 | A | 8/1999 |
| JP | 2002192072 | A | 7/2002 |
| JP | 2007323121 | A | 12/2007 |
| JP | 2008046081 | A | 2/2008 |
| JP | 4997868 | B2 | 8/2012 |
| JP | 2020021758 | A | 2/2020 |
| KR | 20130090500 | A | 8/2013 |
| KR | 20150053726 | A | 5/2015 |
| NL | 7510833 | A | 3/1976 |
| RU | 2004124088 | A | 1/2006 |
| RU | 2318782 | C1 | 3/2008 |
| WO | 1997030848 | A1 | 8/1997 |
| WO | 2002078864 | A1 | 10/2002 |
| WO | 2006082832 | A1 | 8/2006 |
| WO | 2010141743 | A1 | 12/2010 |
| WO | 2018002753 | A1 | 1/2018 |
| WO | 2018193223 | A2 | 10/2018 |
| WO | 2021002061 | A1 | 1/2021 |

* cited by examiner

TRIBOELECTRIC FILM LAMINATE BASED ON CONDUCTIVE PRIMER

CROSS REFERENCE TO RELATED APPLICATIONS

This application is a national stage filing under 35 U.S.C. 371 of PCT/IB2022/057160, filed Aug. 2, 2022, which claims the benefit of U.S. Provisional Application No. 63/229,603, filed Aug. 5, 2021 the disclosures of which are incorporated by reference in their entireties herein.

This invention relates to a triboelectric film and its laminate based on a conductive primer.

There exist many films but there are still almost no film products with electrical functions such as, for example, film sensors or switches because such a product must often satisfy harsh workability requirements. For example, films with circuits of electrical devices such as those with capacitive sensors with conductive materials patterned thereon, make the films difficult to work with. In addition, films such as of decorative types are often cut and stretched in many different shapes and sizes to adjust to a target. Stretching a film may lead to a loss of conductivity or destruction of circuits. For these reasons, films are hard to incorporate electrical functions thereto.

The present invention provides a triboelectric film laminate that utilize a conductive primer. The triboelectric effect is a type of contact electrification such that with a suitable configuration, a current may flow from one region to another. When triboelectric films are touched by human body for example, electrical charges are built up and the generated electrical charges between a human body and films flow through a conductive primer. This system based on the triboelectric effect and the conductive primer can provide electrical functions to film products such as of decorative types without introducing any large changes to the films.

A film may be subjected to a cone calorimetric test to evaluate its noncombustibility. An important factor of a cone calorimeter test is heat release as calculated by the amount of oxygen consumed during combustion. As a requirement for being fireproofed or noncombustible, it is defined herein that when the total heat release for 20 minutes is less than 8.0 $MJ/m^2$, a material is recognized as non-combustible. The triboelectric film and its laminate of the present invention are designed to meet the noncombustibility requirement.

SUMMARY

In one embodiment, a triboelectric film laminate that is fireproof or noncombustible includes a substrate, which acts like an insulator, a conductive primer layer over the substrate, an adhesive layer over the conductive primer layer, and a surface layer over the adhesive layer where the surface layer may be a decorative layer. The substrate and may be, for example, a wall, a floor, a ceiling, a window, interior and exterior parts of cars, trains, or ships and so forth. When the surface layer is touched or rubbed, a triboelectric voltage is generated by which a device may be driven.

In still another embodiment, a similar structure as above but the substrate and the conductive primer layer may be partitioned into two or more regions while the adhesive surface layer runs over the partitioned conductive primer layers, thereby creating discrete electrically divided regions. With the types of configuration above, when for example, a finger or hand, is dragged across the surface layer from one electrically divided region to another, a triboelectric voltage at each region is generated.

The structure described above provides triboelectric voltages by rubbing on or touching the surface of the adhesive layer and it can be configured to drive devices. That is, such a structure can be used to create a switch, sensor, or can be linked to another switch or sensor to activate a device through the switch or sensor.

An example of using the triboelectric film laminate, the electrically divided regions with the conductive primer layer may be electrically linked to a load, such as a switching device like an infrared transmitter with an NPN transistor disposed on one side of the transmitter. An infrared receiver may be provided to receive the infrared signal from the transmitter to turn on or off another device linked to the receiver. By tapping the surface layer, which may be a decorative film, on the side connected to the NPN transistor, a triboelectric voltage is generated to transmit an infrared signal from the infrared transmitter to the infrared receiver. If the infrared receiver is connected to a device such as a lamp, it will turn the lamp on. By tapping the surface layer again, the infrared signal is transmitted to turn the lamp off. The load is not limited to the infrared device; it may be any type of electrical device or transducer. Moreover, the load is not limited to the NPN transistor but may be of any other type of transistor or a combination of transistors that make up a circuit.

In another embodiment, a detecting device for sensing triboelectric voltages is presented. The device includes the following layers: an insulating layer, a conductive primer layer partially disposed over the insulating layer, electrodes disposed on the primer layer, an adhesive layer disposed over the conductive primer layer and partially or wholly disposed over the electrodes; and a surface layer disposed over the adhesive layer. The adhesive layer and the surface layer together may be a transparent film or a decorative film. At least a portion of the conductive primer layer is formed to contact the insulating layer and partitioned into a plurality of discreet electrically divided regions, each electrode is in contact with a portion of one of surfaces of the conductive primer layer and provided in each of the electrically divided regions.

The triboelectric film, its laminate, or the detecting device has the conductive primer layer that is fireproof or noncombustible. To make the film, the laminate, or the detection device fireproof, at least the underlying conductive primer layer is made fireproof or noncombustible. The film, the laminate, or the detecting device is defined herein to be noncombustible if the total heat release for 20 minutes is less than 8.0 $MJ/m^2$ under the cone calorimetric test. The configuration of the present invention achieves noncombustibility and electrical functionality for the triboelectric film, its laminate, and the detecting device using, for example, a decorative wallpaper like a 3M DI-NOC Film (3M Company, St. Paul, Minnesota).

The surface film incorporated in the triboelectric film, its laminate, or the detecting device is not limited to any decorative film like the DI-NOC Film; it may be other types of films decorative or non-decorative, such as 3M FASARA Film, 3M SCOTCHCAL Film, 3M SCOTCHTINT Window Film, 3M Interior Trim Film (ITF) (all manufactured by 3M Company, St. Paul, Minnesota), or any other similar films.

DETAILED DESCRIPTION

The present invention is directed to a triboelectric film and its laminate with a conductive primer layer.

Figure 1:
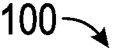
FIG. 1 illustrates a triboelectric film laminate as one embodiment of the invention.
Figure 1:
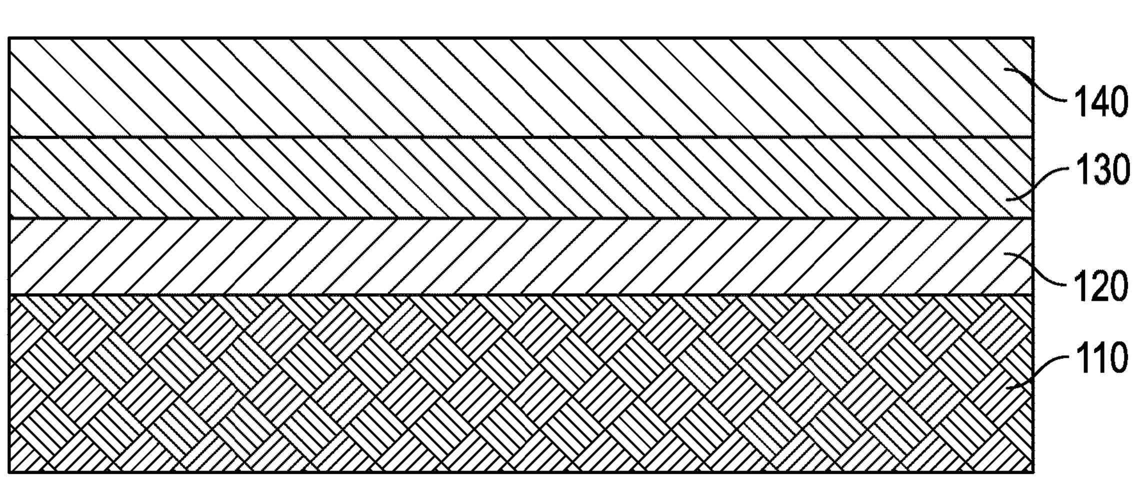

FIG. 1 illustrates triboelectric film laminate 100 with a conductive primer layer. The laminate 100 has substrate 110 which is an electrically insulating or nonconductive layer, conductive primer layer 120 disposed over the insulating layer, adhesive layer 130 disposed over the conductive primer layer 120, and surface layer 140 disposed over the adhesive layer 130. The substrate 110 may be a conventional wall such as a plaster sandwiched with paper or a concrete. Other example of the substrate may be one of glass, resin and paint of a wall, flooring, ceiling, interior or the exterior portions of cars, trains, or ships. The surface layer 140 and the adhesive layer 130 may be a decorative film like the 3M DI-NOC Film or a wallpaper. Other examples of the surface layer 140 may be one or more materials of resin, paper, woven fabric, nonwoven fabric, knitted fabric, metal foil, paint, and rubber. The adhesive layer 130 may be a pressure sensitive adhesive layer. The conductive primer layer 120 may be prepared by materials shown in Table 1 (Examples 1, 2 and 3). The surface layer 140 and adhesive layers 130, 240 and the conductive primer layer 120 may be fireproofed or either the surface and adhesive layers or the conductive primer layer may be fireproofed to make the triboelectric film laminate 100 fireproof or non-combustible. As described in the experiment section below noncombustibility of the triboelectric film laminate is verified at least by the cone calorimetric test.

Figure 2A:
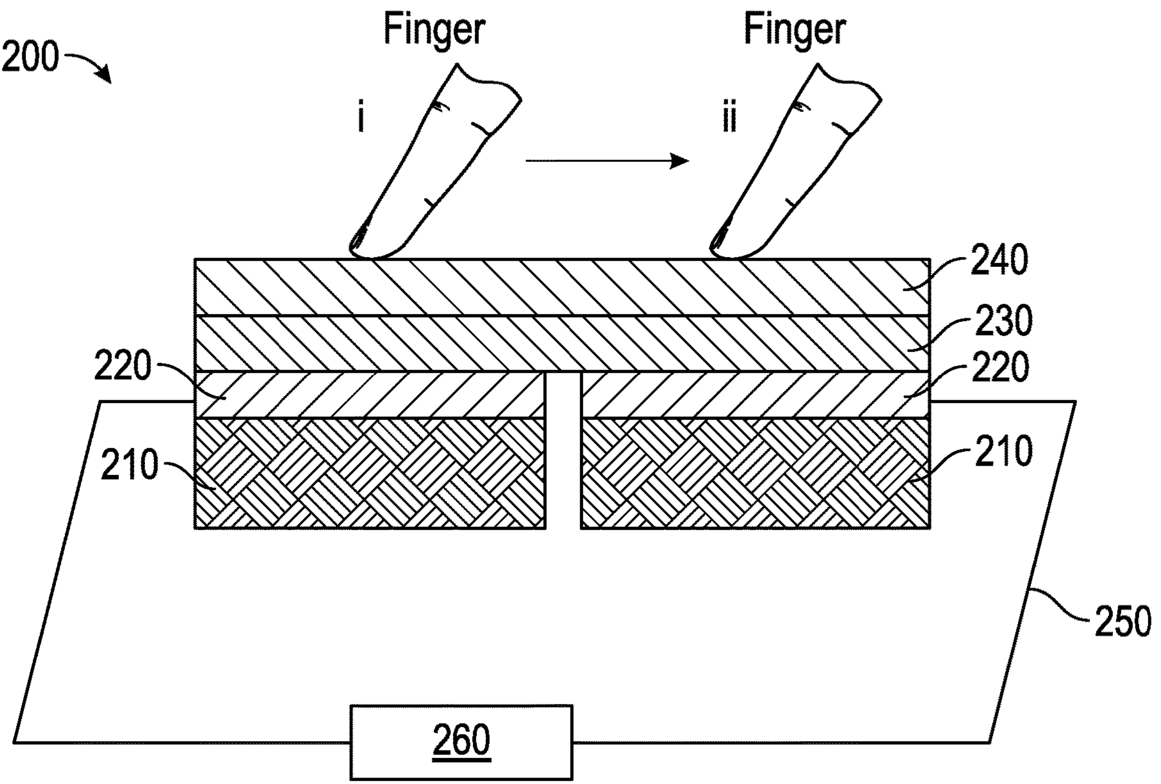
FIGS. 2A and 2B illustrate a triboelectric film laminate showing generation of triboelectric voltages as another embodiment of the invention.
Figure 2B:
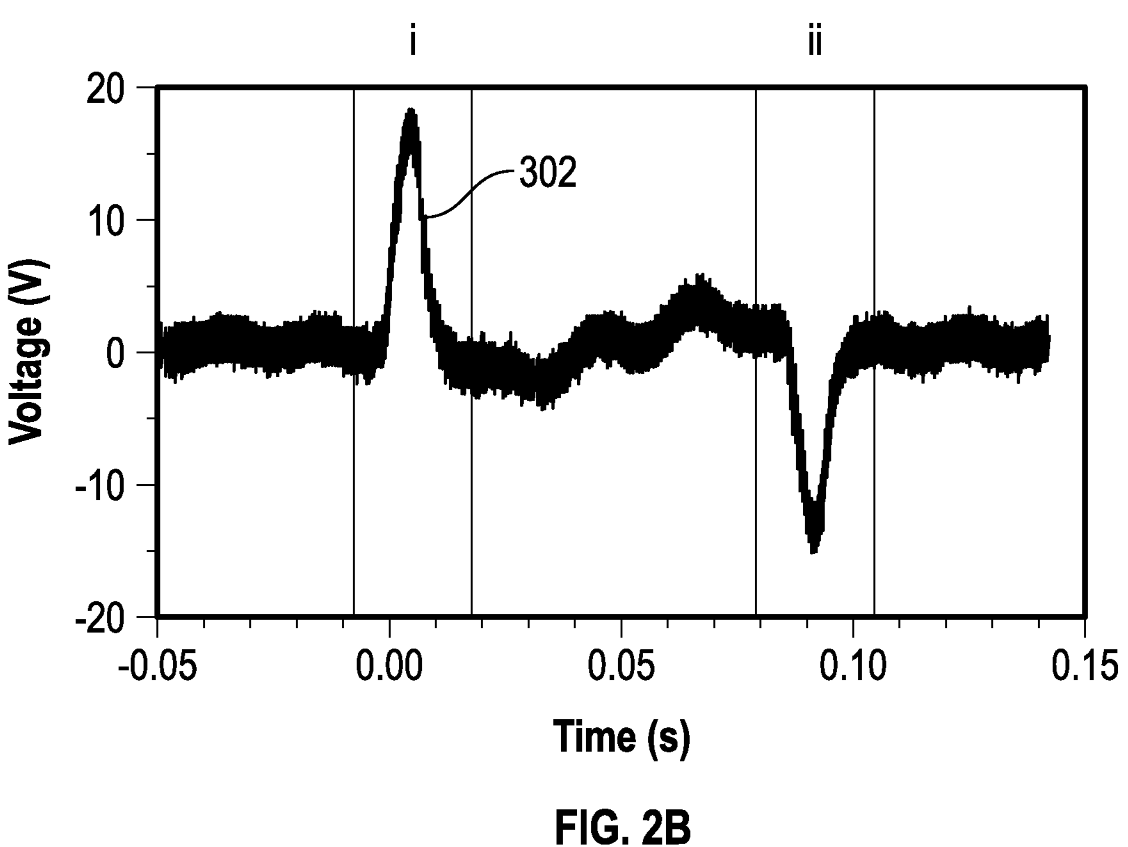

FIGS. 2A and 2B illustrate one embodiment of detecting device 200 for sensing triboelectric voltages. The detecting device 200 has two separate substrates 210 and two conductive primer layers 220 disposed over the two substrates 210. Here, the conductive primer layers 220 were made by applying 1.2 g of conductive primer on each of two plaster boards as the substrates. It also has adhesive layer 230 over the two conductive primer layers 220, and surface layer 240 disposed over the adhesive layer 230. A film corresponding to the adhesive layer 230 and the surface layer 240 may be a decorative film, such as 3M DI-NOC Film ST-442EX or 3M DI-NOC Film FW-888 (both 3M Company, St. Paul, Minnesota). With this structure, the electrically divided regions are formed where each region is defined by the respective conductive primer layer 220 that is electrically partitioned. The conductive primer layers 220 may be prepared by materials shown in Table 1. A load such as a voltage sensor may be attached to the conductive primer layers 220 at the peripheral ends with conductive wires 250. Illustrated here is oscilloscope 260 to show the voltages generated. However, the load is not limited to the oscilloscope and may be any sensor or switch or a transducer such as a microphone, a heat sensor, position and pressure sensors, antenna, and so forth.

By running or rubbing a hand or finger from (i) to (ii) as shown in FIG. 2A, that is from one electrically divided region to another, a triboelectric voltage may be generated at each electrically divided region as shown in plot 302 of FIG. 2B, which may be detected by the oscilloscope 260.

Figure 3A:
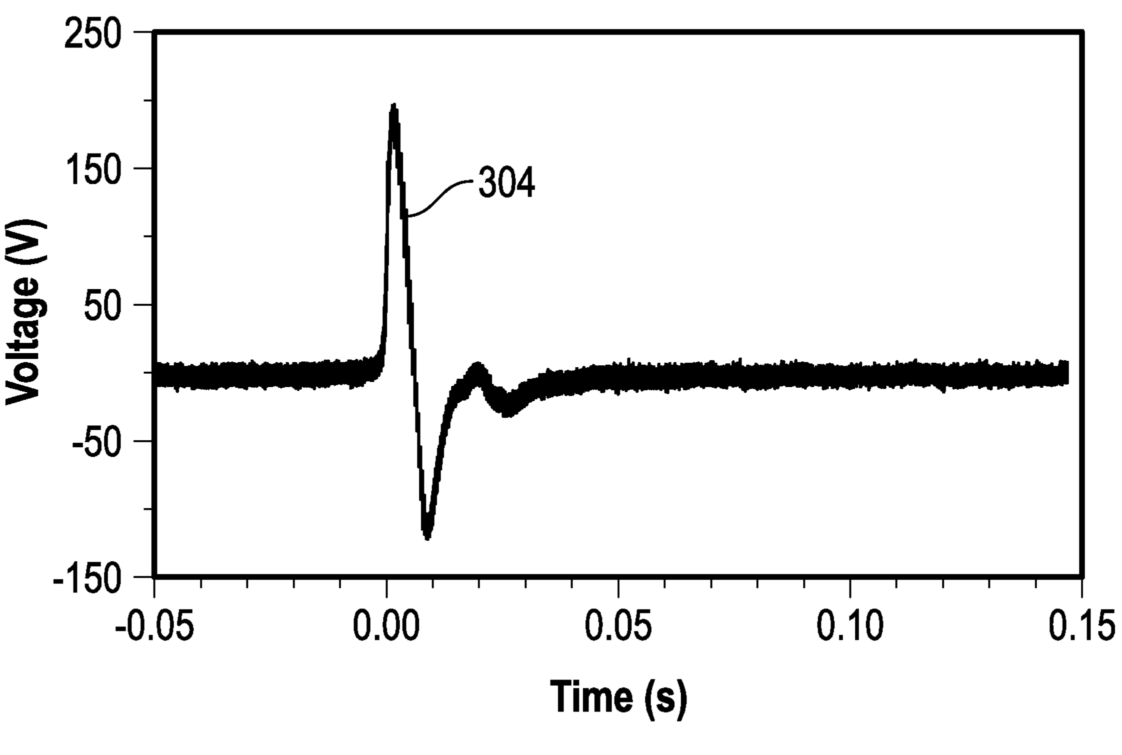
FIGS. 3A and 3B illustrate triboelectric voltages by tapping triboelectric film laminate as another embodiment of the invention.
Figure 3B:
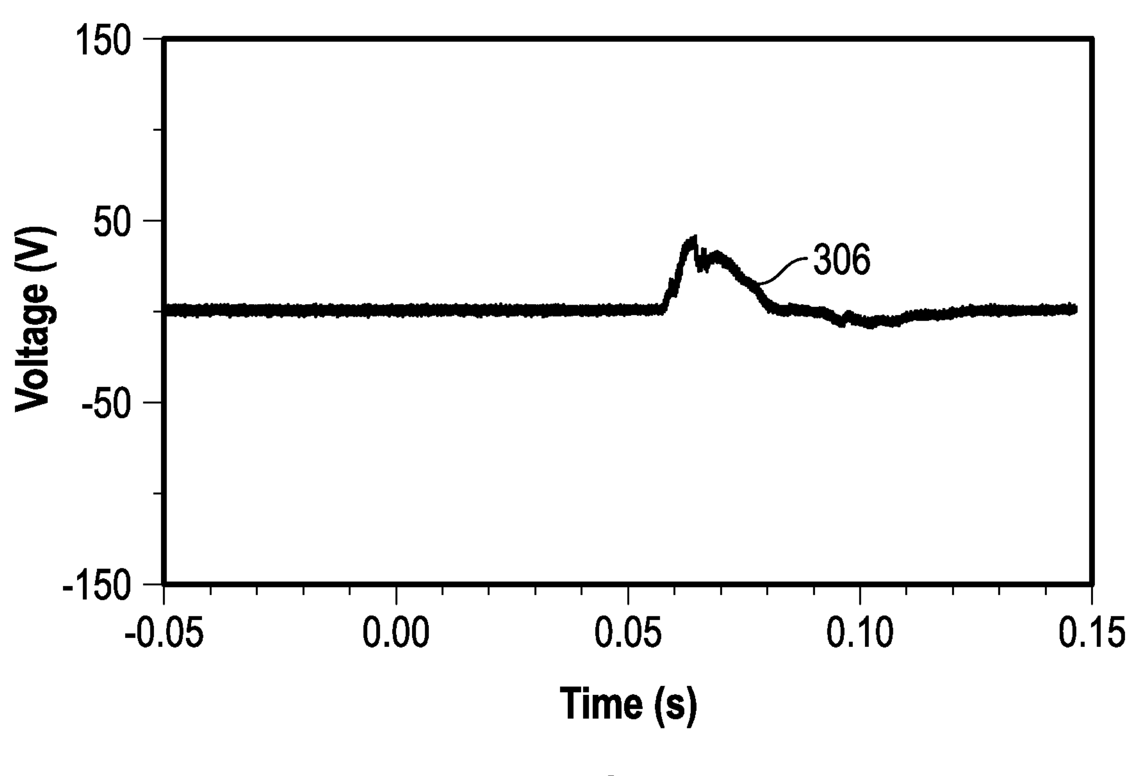

FIGS. 3A and 3B show that a different triboelectric voltage signatures may be generated when a finger or a hand is used to tap the surface of the film in plots 304, 306, respectively, when different materials are used. ST-442EX is used as the adhesive layer and the surface layer of FIG. 3A in the configuration shown in FIG. 2A. FW-888 is used as the adhesive layer and the surface layer of FIG. 3B in the configuration shown in FIG. 2A.

Figure 4A:
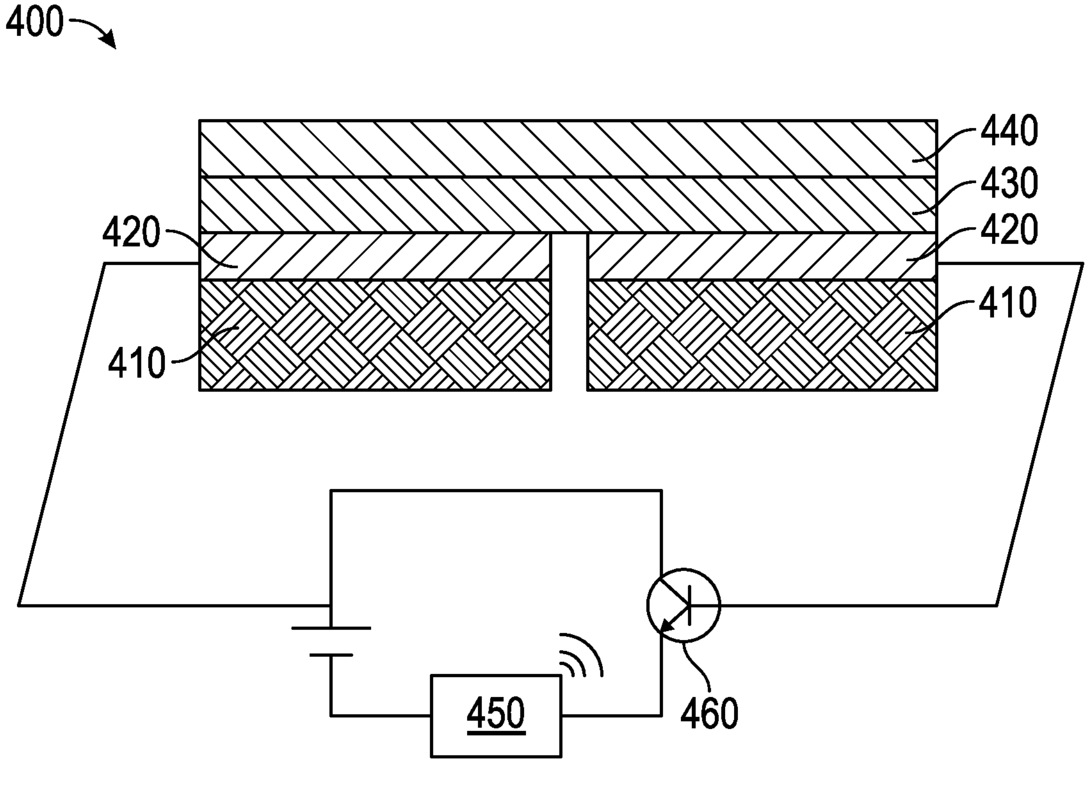
FIGS. 4A, 4B, and 4C illustrate a triboelectric film laminate with a switching device as still another embodiment of the invention.
Figure 4B:
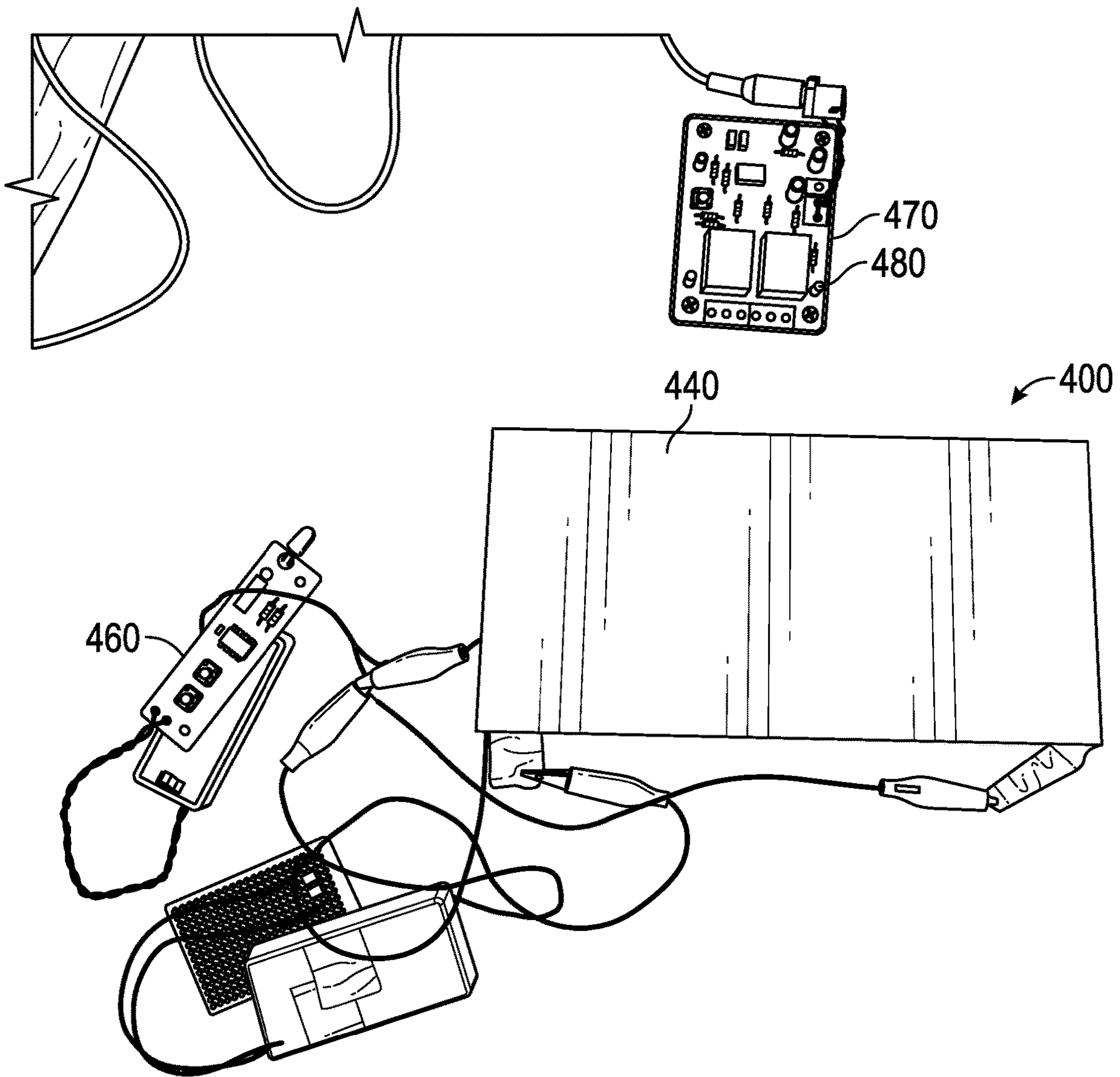
Figure 4C:
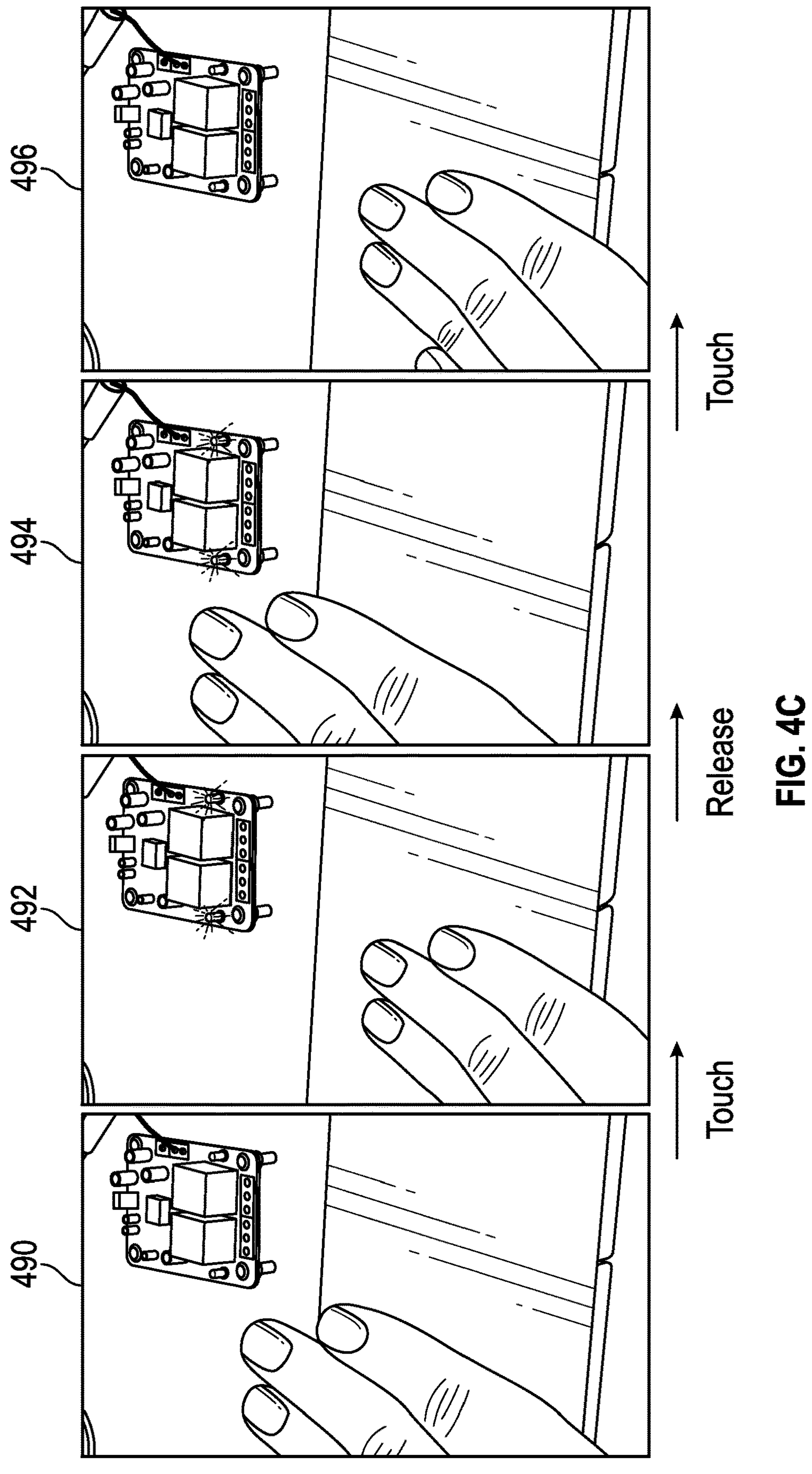

FIGS. 4A, 4B, and 4C illustrate another example of using a triboelectric film laminate. The elements of the laminate 400 of this example as shown in FIGS. 4A and 4B—substrate 410, adhesive layer 430, and surface layer 440—correspond to those shown in FIG. 2A except that the electrically divided regions with conductive primer layer 420 may be electrically linked to a load such as a switching device like an infrared transmitter 450 with NPN transistor 460 disposed on one side of the transmitter 450. Infrared receiver 470 may be provided to receive an infrared signal from the transmitter 450 to turn on or off another device linked to the receiver. As shown in the images 490, 492, 494, 496 of FIG. 4C, by tapping the surface layer 440, which may be a decorative film, on the side connected to the NPN transistor 460, a triboelectric voltage is generated to transmit an infrared signal from the infrared transmitter 450 to the infrared receiver 470. If the infrared receiver 470 is integrated with lamp 480, it may turn the lamp on. By tapping the surface layer 440 again, the infrared signal may be transmitted to turn the lamp off. The load is not limited to the infrared devices and the NPN transistor; it may be any other type of electrical transducer within or with a circuit.

Figure 5:
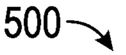
FIG. 5 shows a detecting device using a triboelectric film laminate with electrodes as still another embodiment of the invention.
Figure 5:
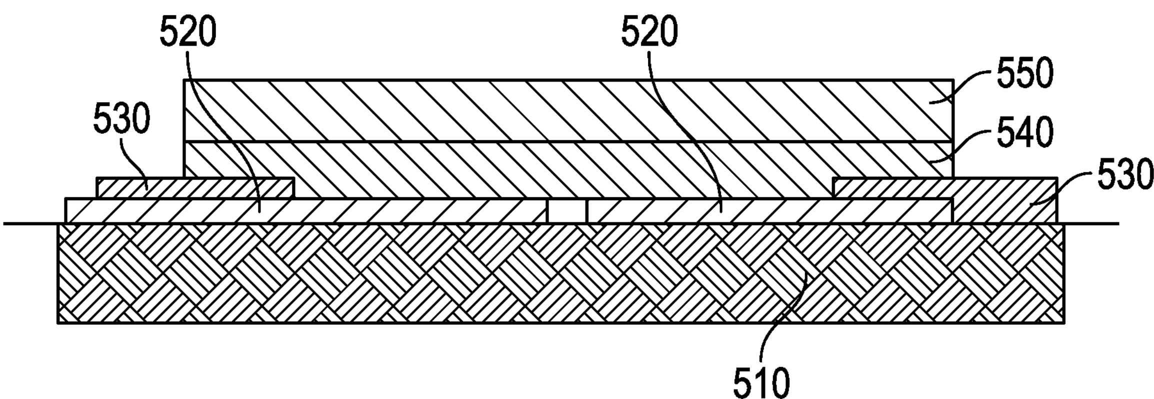

As illustrated in FIG. 5, an example of a detecting device for sensing triboelectric voltages is presented. Detecting device 500 includes electrically insulating layer 510, which is a substrate, conductive primer layer 520 partially disposed over the insulating layer 510, electrodes 530 disposed on the conductive layer 520, adhesive layer 540 disposed over the conductive primer layer 520 and partially or wholly disposed over the electrodes 530, and surface layer 550 disposed over the adhesive layer 540. The adhesive layer 540 and the surface layer 550 together may be a decorative film such as one of the 3M DI-NOC Films (e.g. FW-1129EX (3M Company, St. Paul, Minnesota)) or the like. At least a portion of the conductive primer layer 520 may be formed to contact the insulating layer 510 and partitioned into a plurality of discreet electrically divided regions. Each electrode may be in contact with a portion of one of surfaces of the conductive primer layer 520 and provided in each of the electrically divided regions. The conductive primer layer 520 may be prepared by materials shown in Table 1 (Examples 1, 2 and 3).

The surface layer 550 may be one or more materials of resin, paper, woven fabric, nonwoven fabric, knitted fabric, metal foil, paint, and rubber. The adhesive layer 540 may be a pressure sensitive adhesive layer. The surface and adhesive layers 550, 540 and the conductive primer layer 520 may be fireproofed or just the conductive primer layer 520 may be fireproofed to make the detecting device 500 noncombustible. As described in the experiment section below, the fireproofing of the triboelectric film laminate may be verified at least by the cone calorimetric test. The detecting device 500 may be made fireproof or noncombustible by fireproofing both the surface and adhesive layers 550, 540 and the conductive primer layer 520 or just one of these.

The insulating layer 510 may be a conventional wall such as a plaster sandwiched with paper or a concrete. Other examples of the insulating layer 510 may be one of glass, resin and paint of a wall, flooring, ceiling, interior or the exterior portions of cars, trains, or ships.

This configuration may also provide a basis for generating and detecting triboelectric voltages by connecting a load such as a sensor or a switch or other types of transducer to each of the electrodes 530, such that a triboelectric film laminate, which may be a decorative film, with electrical functionalities is provided.

Figure 6:
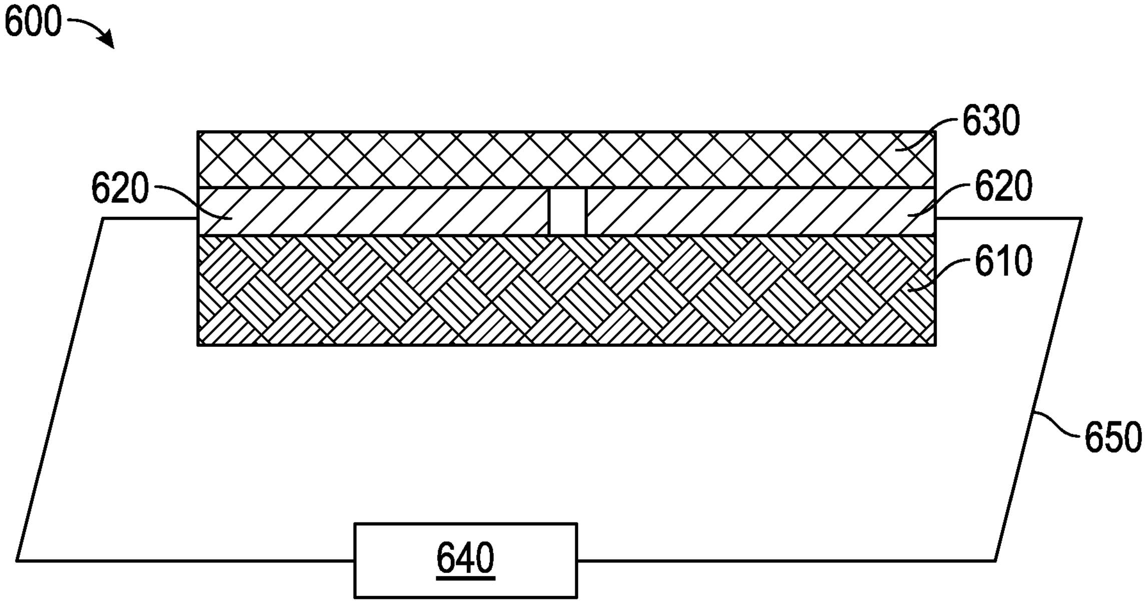
FIG. 6 shows a triboelectric film laminate with a load as still another embodiment of the invention.

FIG. 6 shows triboelectric film laminate 600 including substrate 610, conductive primer layers 620, which are partitioned, disposed over the substrate 610, surface/adhesive layer 630 is disposed over the conductive primer layers 620. FIG. 5 shows electrodes but in FIG. 6, load 640 is connected to the ends of the conductive primer layers 620 such that they themselves act like electrodes. In this embodiment, no electrodes are included, and this may improve the workability of the triboelectric film laminate 600.

The triboelectric film layer 600 may be made fireproof or noncombustible by fireproofing both the surface/adhesive layer 630 and the conductive primer layer 620 or just one of these.

EXAMPLES

Materials

TABLE 1

| Materials List | | |
|---|---|---|
| Material | Description | Source |
| SG-BH8 | Spherical graphite powder | Ito Graphite Co., Ltd. (Kuwana City, Mie, Japan) |
| COLCOART CS-3001 | Dispersed aqueous solution of CNT with silicate polymer. | COLCOAT CO., LTD. (Ohta-ku, Tokyo, Japan) |
| VINIBLAN 715 | Vinyl chloride polymer emulsion, 25% by mass of solid content | Nissin Chemical Industry Co., Ltd. (Echizen City, Fukui, Japan) |
| KUNIPIA-M | Montmorillonite | Kunimine Industries, Co., Ltd. (Chiyoda-ku, Tokyo, Japan) |
| LAPONITE-S 482 | Synthetic Hectorite | BYK Japan KK (Shinjuku-ku, Tokyo, Japan) |
| Potassium Silicate 2K | 30% of potassium silicate aqueous solution | Nippon Chemical Industrial Co., Ltd. (Koto-ku, Tokyo, Japan) |
| Sodium diphosphate decahydrate | Additives | FUJIFILM Wako Pure Chemical Corporation (Osaka City, Osaka, Japan) |
| Tannic Acid | Additives | FUJIFILM Wako Pure Chemical Corporation (Osaka City, Osaka, Japan) |
| TIGER BOARD GB-R | Gypsum Board, Thickness: 12.5 mm | YOSHINO GYPSUM Co., Ltd. (Chiyoda-ku, Tokyo, Japan) |
| CHLOROPRENE 671A | Aqueous dispersion of chloroprene rubber | Showa Denko K.K. (Minato-ku, Tokyo, Japan) |

TABLE 1-continued

| Materials List | | |
|---|---|---|
| Material | Description | Source |
| EPOCROS K-2030E | Emulsion of oxazoline-functional polymer | Nippon Shokubai Co., Ltd. (Osaka City, Osaka, Japan) |
| OLFINE EXP. 4123 | Acetylene-based surfactant, 40% by mass of active ingredient | Nissin Chemical Industry Co., Ltd. (Echizen City, Fukui Prefecture, Japan) |
| TUBALL COAT_E H2O SDBS | Aqueous dispersion of carbon nanotube, 1.2% by mass of carbon nanotube and dispersant | Kusumoto Chemicals, Ltd. (Chiyoda-ku, Tokyo, Japan) |
| FG-3X | Silver-coated nickel filler | Nikko Rica Corporation (Chiyoda-ku, Tokyo, Japan) |
| COMOGLAS P | Acrylic Board, Thickness: 3.0 mm | Kuraray Co., Ltd. (Chiyoda-ku, Tokyo, Japan) |
| PS-3247 | Infrared transmitter/receiver with LED Lamps kit | EK Japan Co., Ltd. (Dazaifu City, Fukuoka, Japan) |
| ST-442EX | 3M DI-NOC Film with outdoor weatherability | 3M Company (St. Paul, Minnesota) |
| FW-888 | 3M DI-NOC Film | 3M Company (St. Paul, Minnesota) |
| FW-1129EX | 3M DI-NOC Film | 3M Company (St. Paul, Minnesota) |

Formulations

Examples 1-3 were generated using the formulations listed in Table 2.

TABLE 2

| Example Formulations | | | |
|---|---|---|---|
| | Example 1 | Example 2 | Example 3 |
| KUNIPIA-M (wt %) | 30.7 | 31.3 | 30.7 |
| LAPONITE-S 482 (wt %) | 27.4 | 28.0 | 27.4 |
| Potassium Silicate 2K (wt %) | 1.70 | 1.90 | 1.70 |
| Sodium diphosphate decahydrate (wt %) | 1.70 | 1.73 | 1.70 |
| VNYBLAN 715 (wt %) | — | 14.3 | — |
| CHLOROPRENE 671A (wt %) | 16.1 | — | 16.1 |
| EPOCROS K-2030E (wt %) | 0.67 | 0.71 | 0.67 |
| OLFINE EXP. 4123 (wt %) | 2.44 | 2.38 | 2.44 |
| TUBALL COAT_E $H_2O$ SDBS (wt %) | 1.09 | 1.11 | 1.09 |
| FG-3X (wt %) | 18.2 | 18.6 | 18.2 |
| Solid content (% by mass) | 12 | 13 | 12 |
| Coating amount (g) | — | 1.9 | 1.9 |
| Solid content ($g/m^2$) of fireproof layer | — | 24 | 23 |

Example 1 of Triboelectric Film Laminate

While 75 g of aqueous dispersion of KUNIPIA-M having 5.6% by mass of solid content was stirred, 0.39 g of sodium diphosphate decahydrate, 11 g of distilled water and 3.8 g of LAPONITE-S 482 were slowly added and sufficiently stirred. 3.9 g of CHLOROPRENE 671A, 0.24 g of EPOCROS K-2030E, 13 g of TUBALL COAT_E $H_2O$ SDBS and 2.6 g of FG-3X were added to 94 g of the resulting aqueous dispersion, and the mixture was sufficiently mixed. Next, 0.81 g of Potassium Silicate 2K was mixed, and then 0.87 g of OLFINE EXP. 4123 was mixed with the mixture to obtain a coating liquid, a conductive primer. Three layers of the conductive primer were formed by applying the resulting coating liquid to the COMOGLAS P acrylic board and naturally dried 3 times. Then FW-1129EX was laminated on to the coated COMOGLAS P acrylic board to obtain a sample, a triboelectric film laminate, for evaluation with the embodiment shown in FIGS. 4A, 4B and 4C. An infrared transmitter of PS-3247 was connected to layer of conductive primers through Cu tapes and an infrared transmitter was connected and drive LED lamps on an infrared receiver of PS-3247.

Example 2 of Triboelectric Film Laminate

While 75 g of aqueous dispersion of KUNIPIA-M having 5.6% by mass of solid content was stirred, 0.39 g of Sodium diphosphate decahydrate, 11 g of distilled water and 3.8 g of LAPONITE-S 482 were slowly added and sufficiently stirred. 1.5 g of VINYBLAN 715, 0.045 g of EPOCROS K-2030E, 2.3 g of TUBALL COAT_E $H_2O$ SDBS and 0.47 g of FG-3X were added to 17 g of the resulting aqueous dispersion, and the mixture was sufficiently mixed. Next, 0.16 g of Potassium Silicate 2K was mixed, and then 0.15 g of OLFINE EXP. 4123 was mixed with the mixture to obtain a coating liquid, a conductive primer. The resulting coating liquid, 1.9 g (0.24 g of solid content) was applied to TIGER BOARD GB-R, naturally dried, and then FW-888 was laminated on to the coated TIGER BOARD GB-R gypsum board to obtain a sample, a triboelectric film laminate, for evaluation of non-combustibleness.

Example 3 of Triboelectric Film Laminate

While 75 g of aqueous dispersion of KUNIPIA-M having 5.6% by mass of solid content was stirred, 0.39 g of sodium diphosphate decahydrate, 11 g of distilled water and 3.8 g of LAPONITE-S 482 were slowly added and sufficiently stirred. 3.9 g of CHLOROPRENE 671A, 0.24 g of EPOCROS K-2030E, 13 g of TUBALL COAT_E $H_2O$ SDBS and 2.6 g of FG-3X were added to 94 g of the resulting aqueous dispersion, and the mixture was sufficiently mixed. Next, 0.81 g of Potassium Silicate 2K was mixed, and then 0.87 g of OLFINE EXP. 4123 was mixed with the mixture to obtain a coating liquid, a conductive primer. The resulting coating liquid, 1.9 g (0.23 g of solid content), was applied to TIGER BOARD GB-R, naturally dried, and then FW-1129EX was laminated on to the coated TIGER BOARD GB-R gypsum board to obtain a sample, a triboelectric film laminate, for evaluation of non-combustibleness.

Test Method

Cone Calorimetry:

Measurement of the decreasing oxygen concentration in the combustion gases of a sample subjected to a given heat flux were made. The following cone calorimeter test standards were used: United States ASTM E 1354, International standard ISO 5660. The sample was placed on a load cell to evaluate the evolution of mass loss during the experiment. A conical radiant electrical heater uniformly irradiated the sample from above. Combustion was triggered by an electric spark. The combustion gases passed through the heating cone and were captured by means of an exhaust duct system with a centrifugal fan and hood. The gas flow, oxygen, CO, $CO_2$ concentrations and smoke density were measured in the exhaust duct. When the total heat release for 20 minutes did not exceed more than 8.0 $MJ/m^2$, a material was recognized as non-combustible.

Results

As shown in FIGS. 4A, 4B and 4C, LED lights glowed when fingers were swiped across the sample. As the results shown in Table 3 below, the calorimetric tests were conducted on Examples 2 and 3 to show that they meet the requirements of being non-combustible.

TABLE 3

Calorimetric Test Results

| | Example 2 | Example 3 |
|---|---|---|
| Total heat value ($MJ/m^2$) for 20 minutes was not more than 8.0 ($MJ/m^2$) | Passed | Passed |

ILLUSTRATIVE EMBODIMENTS

Various embodiments of the present application may include one or more of the following:

[1] A triboelectric film laminate, comprising: a substrate which acts like an insulator; a conductive primer layer is disposed over the substrate; an adhesive layer disposed over the conductive primer layer; and a surface layer disposed over the adhesive layer, the surface layer being a decorative film.

[2] A triboelectric film laminate, comprising: two or more substrates, each separate from one another and act like an insulator; two or more conductive primer layers that are correspondingly disposed over the substrates; and an adhesive layer disposed over the conductive primer layers, wherein each conductive primer layer disposed over each substrate is partitioned to be an electrically divided region.

[3] The triboelectric film laminate according to [1] or [2], wherein the triboelectric film is fireproof or noncombustible.

[4] The triboelectric film laminate according to [1] or [2], wherein the triboelectric film laminate is fireproof or noncombustible.

[5] A detecting device for sensing triboelectric voltages, comprising: an insulating layer; a conductive primer layer partially or wholly disposed over the insulating layer; electrodes deposited on the conductive layer; an adhesive layer disposed over the conductive primer layer and partially or wholly disposed over the electrodes; and a surface layer disposed over the adhesive layer, wherein at least a portion of the conductive primer layer is formed to contact the insulating layer and partitioned into a plurality of electrically divided regions, each electrode is in contact with a portion of one of surfaces of the conductive layer and provided for each of the electrically divided regions.

[6] The detecting device according to [5], wherein at least a portion of the adhesive layer is formed to contact the conductive primer layer.

[7] The detecting device according to [5], wherein the surface layer comprises one or more materials selected from resin, paper, woven fabric, nonwoven fabric, knitted fabric, metal foil, paint, and rubber.

[8] The detecting device according to [5], wherein the adhesive layer and the surface layer are formed with an article comprising the surface layer and a pressure sensitive adhesive layer formed on one of surfaces of the surface layer.

[9] The detecting device according to [5], wherein the insulating layer is one of concrete, glass, plaster board, resin, and paint.

[10] The detecting device according to [5], further comprising a transducer connected to one electrode at one side and another electrode at an opposite side to complete a circuit.

[11] A manufacturing method of a detection device comprising: forming a conductive primer layer partitioned in a plurality of electrically divided regions on a surface of an insulating layer; providing electrodes in each of the electrically divided regions; and forming an adhesive layer and a surface layer on an opposite surface from a side of the insulating layer of the conductive primer layer.

[12] A detecting device for sensing triboelectric voltages, comprising: a substrate which acts like an insulator, a conductive primer layer disposed over the substrate; an adhesive layer disposed over the conductive primer layer; and a surface layer disposed over the adhesive layer.

[13] The detecting device according to [12], wherein the surface layer has a decorative film on the opposite side to the adhesive layer, and the detecting device is fireproof or noncombustible

[14] The detecting device according to [12], wherein the adhesive layer and the surface layer are formed with an article comprising the surface layer and a pressure sensitive adhesive layer formed on one of surfaces of the surface layer.

[15] A detecting device for sensing triboelectric voltages, comprising: two or more substrates, each partitioned from one another and act like an insulator; two or more conductive primer layers that are correspondingly disposed over the substrates and partitioned; an adhesive layer disposed over the conductive primer layers; a surface layer disposed over the adhesive layer; and a load connected on one side to the one of the conductive primer layers and connected on another side to one of the other conductive primer layers partitioned from the one of the conductive primer layers, wherein each conductive primer layer disposed over each substrate is partitioned to be an electrically divided region.

[16] The detecting device according to [15], wherein the surface layer has a decorative film on the opposite side to the adhesive layer and the detecting device is fireproof or noncombustible.

[17] The detecting device according to [15], wherein the load is a transducer.

[18] The detecting device according to wherein the load is a sensor or a switch.

[19] The detecting device according to [15], wherein the surface layer comprises one or more materials selected from resin, paper, woven fabric, nonwoven fabric, knitted fabric, metal foil, paint, and rubber.

[20] The detecting device according to [15], wherein the adhesive layer and the surface layer are formed with an article comprising the surface layer and a pressure sensitive adhesive layer formed on one of surfaces of the surface layer.

[21] The detecting device according to [15], wherein the substrates are one of concrete, glass, plaster board, resin, and paint.

Thus, various embodiments of a TRIBOELECTRIC FILM LAMINATE BASED ON CONDUCTIVE PRIMER are disclosed.

Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The term "or" is generally employed in its inclusive sense, for example, to mean "and/or" unless the context clearly dictates otherwise.

The phrases "at least one of," "comprises at least one of," and "one or more of" followed by a list refers to any one of the items in the list and any combination of two or more items in the list.

The invention claimed is:

1. A triboelectric film laminate, comprising:
a substrate which acts like an insulator;
a conductive primer layer disposed over the substrate;
an adhesive layer disposed over the conductive primer layer;
a surface layer disposed over the adhesive layer, the surface layer being a decorative film; and
electrodes deposited on the conductive primer layer,
wherein at least a portion of the conductive primer layer is formed to contact the substrate and partitioned into a plurality of electrically divided regions, and each electrode is in contact with a portion of one of surfaces of the conductive primer layer and provided for each of the electrically divided regions.

2. The triboelectric film laminate according to claim 1, wherein at least a portion of the adhesive layer is formed to contact the conductive primer layer.

3. The triboelectric film laminate according to claim 1, wherein the surface layer comprises one or more materials selected from resin, paper, woven fabric, nonwoven fabric, knitted fabric, metal foil, paint, and rubber.

4. The triboelectric film laminate according to claim 1, further comprising a transducer connected to one electrode at one side and another electrode at an opposite side to complete a circuit.

5. A detecting device for sensing triboelectric voltages, comprising:
first and second substrates, each partitioned from one another and act like an insulator;
a first conductive primer layer disposed over the first substrate and a second conductive primer layer disposed over the second substrate, wherein the first and second conductive primer layers are partitioned from one another;
a single adhesive layer disposed over both the first and second conductive primer layers;
a surface layer disposed over the adhesive layer; and
a load connected on one side to the first conductive primer layer and connected on another side to the second conductive primer layer,
wherein the first conductive primer layer disposed over the first substrate and the second conductive primer layer disposed over the second substrate are each partitioned to be an electrically divided region.

6. The detecting device according to claim 5, wherein the surface layer has a decorative film on the opposite side to the adhesive layer and the detecting device is fireproof or noncombustible.

7. The detecting device according to claim 5, wherein the load is a transducer.

8. The detecting device according to claim 5, wherein the surface layer comprises one or more materials selected from resin, paper, woven fabric, nonwoven fabric, knitted fabric, metal foil, paint, and rubber.

* * * * *